United States Patent [19]

Reinicke

[11] 4,223,698
[45] Sep. 23, 1980

[54] SOLENOID OPERATED BIPROPELLANT VALVE

[75] Inventor: Robert H. Reinicke, Mission Viejo, Calif.

[73] Assignee: Parker-Hannifin Corporation, Cleveland, Ohio

[21] Appl. No.: 884,875

[22] Filed: Mar. 9, 1978

[51] Int. Cl.$^2$ .............................................. F16K 11/14
[52] U.S. Cl. .................................... 137/595; 137/607; 137/870
[58] Field of Search ........................ 137/595, 870, 607

[56] References Cited

U.S. PATENT DOCUMENTS

| 3,472,277 | 10/1969 | Reinicke et al. | 137/595 |
| 3,661,178 | 5/1972 | Wichmann | 137/595 |

FOREIGN PATENT DOCUMENTS

| 1086479 | 8/1959 | France | 137/607 |

Primary Examiner—Arnold Rosenthal
Attorney, Agent, or Firm—James A. Baker

[57] ABSTRACT

A valve for simultaneously controlling the flow of two propellant fluids to a rocket engine. The valve has separate flow passages for the two fluids and a separate valve element for controlling the flow through each passage. A single solenoid simultaneously controls the movement of both valve elements and each valve element provides a portion of the path for the magnetic flux generated by the solenoid. Each flow passage leads to a series of openings in a wall of the engine, such openings serving as injection orifices to the combustion chamber of the engine. The openings are of small diameter and length so that the volume of the openings between the valve seat and the combustion chamber is relatively small. Separation of the two flow passages is accomplished without the use of flexible or sliding seals.

24 Claims, 3 Drawing Figures

SOLENOID OPERATED BIPROPELLANT VALVE

BACKGROUND OF THE INVENTION

Bipropellant rocket engines use two propellant fluids, a fuel and an oxidizer, which are simultaneously fed into the combustion chamber of the engine through separate flow passages from separate tanks for each fluid. The fluids burn instantly upon contact with each other and thus it is extremely important to keep the fluids separated until they have been injected into the combustion chamber. The flow of the fluids must be simultaneously controlled and in the correct proportions. In the past this has been done with separate valves whose opening and closing movements have been synchronized either by mechanical interconnection or by simultaneous operation of separate solenoids. Both methods have disadvantages, such as requiring sliding or flexible seals that are subject to wear and dangerous leakage. In addition in both methods it is difficult to achieve precise simultaneous opening and closing because of manufacturing tolerances of the parts. Also, prior valving arrangements have utilized a manifold between each valve and the injection orifices that results in substantial dribble volume, that is, the volume of fluid between the valves at shut off and the combustion chamber end of the injection orifices. It is highly desirable to minimize dribble volume in order to have rapid engine combustion response upon opening and closing of the valves.

SUMMARY OF THE INVENTION

The present invention overcomes the above mentioned disadvantages of prior valves for controlling fuel and oxidizer flow to rocket engine combustion chambers. It achieves simultaneous opening of the valves to a high degree without regard to manufacturing tolerances by using a single solenoid for opening both valves. The two movable valve elements each form a portion of the path for magnetic flux generated by the single solenoid so that the two valve elements are simultaneously activated as armatures upon energization and de-energization of the solenoid. Each valve seats on an end face against a flat transverse face of a wall member to close ports through which fluids are injected into the engine. Each valve port comprises a series of small diameter openings, located coaxially with respect to each other, of short length between the valve seats and the combustion chamber. This arrangement provides an extremely small dribble volume as compared with prior valves for rocket engines.

DETAIL DESCRIPTION

Figure 2:
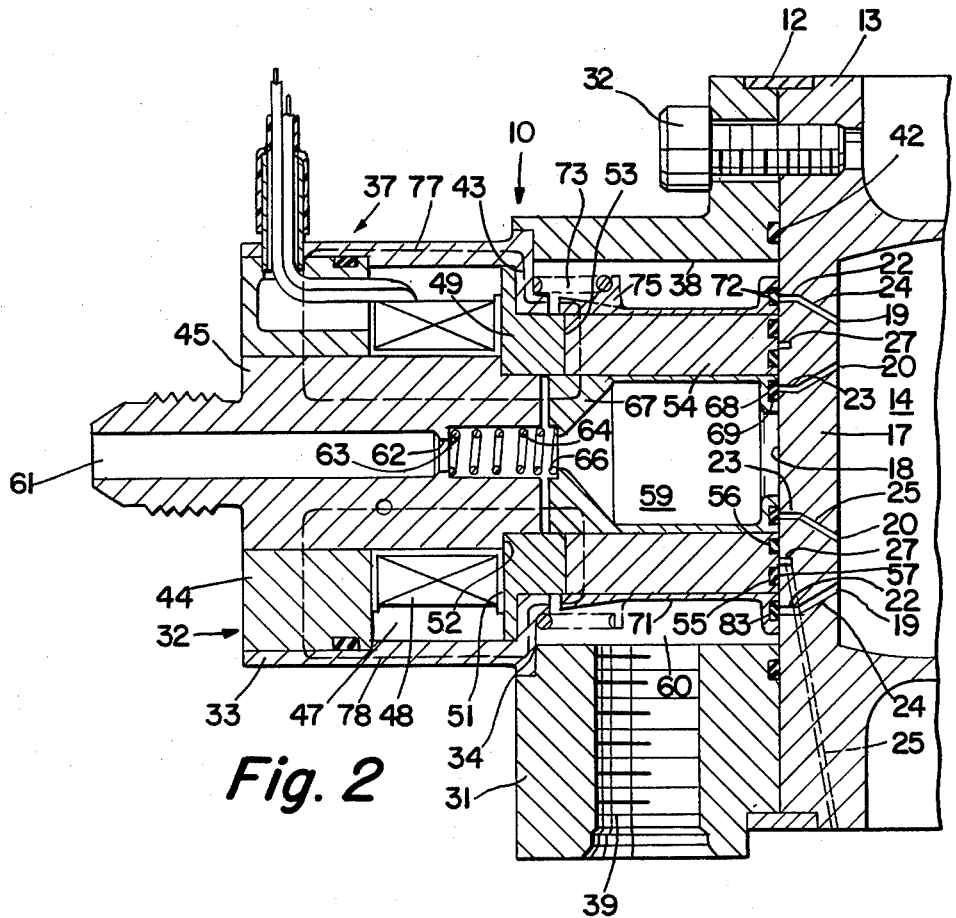
FIG. 2 is a cross-section view of the bipropellant valve as mounted on the rocket engine.
Figure 3:
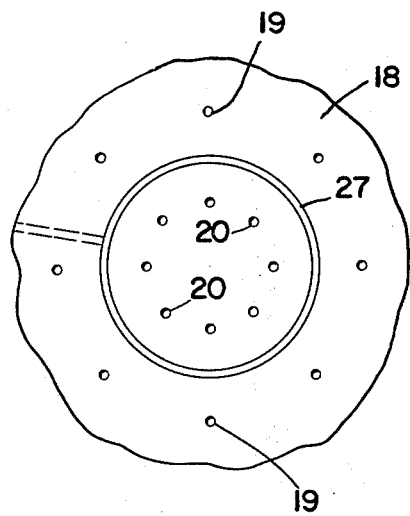
FIG. 3 is a fragmentary end view of the outer face of the thrust chamber wall upon which the valve is mounted.
Figure 1:
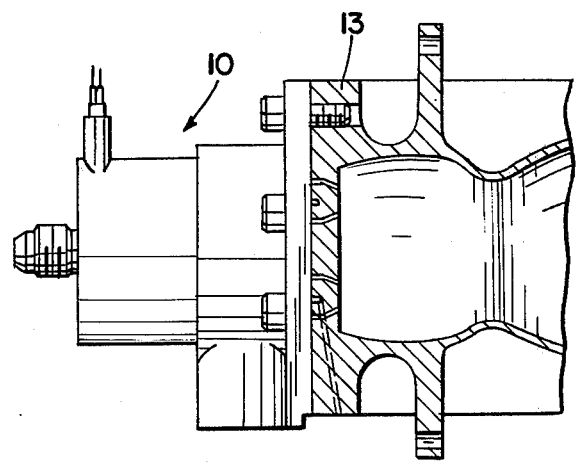
FIG. 1 is a simplified cross-section view of the thrust chamber of a rocket engine with the bipropellant valve mounted thereon.

The bipropellant valve 10 is attached by bolts 32 and an indexing ring 12 to a thrust chamber housing 13 of a rocket engine. Housing 13 has a combustion chamber 14 with an end wall 17 having a flat planar outer face 18 that has a first and second series of circumferentially spaced injection ports 19,20 therethrough. These ports have axial portions 22,23 and angularly directed portions 24,25 so that a fuel flowing through ports 19 and an oxidizer flowing through ports 20 will be directed into contact with each other within chamber 14 whereby the fuel will be ignited. Ports 19,20 are of relatively small diameter and total length so that their volumetric capacity is relatively small. A vent or drain passage is formed in wall 17 and comprises an annular recess 27 in face 18 and a radial port 25 that connects recess 27 to the exterior of housing 13.

Valve 10 includes a valve housing 31 of nonmagnetic material bolted at 32 and centered by indexing ring 12 to housing 13 and welded at 34 to a solenoid housing generally designated 37. Valve housing 31 has a bore 38 therethrough connected to an inlet port 39 and is sealed against face 18 by an annular gasket 42.

Solenoid housing 37 includes a cylindrical housing member 33 with a flange 43, a closure member 44 and a central member 45, all of magnetic material. These housing members form an annular chamber 47 containing a solenoid 48. The inner end of chamber 47 is closed by a nonmagnetic member 49 whose upper face 51 abuts a shoulder 52 in central member 45 and whose lower face 53 bears against an annular spacer 54 that has annular grooves 55,56 at its lower end containing sealing rings 57,58 and forms first and second valve chambers 59,60. Central member 45 has an inlet port 61 that has a reduced diameter portion 62 that forms a shoulder 63 against which one end of a coil spring 64 bears. The other end bears against the upper end 66 of a first hollow valve element 67 in chamber 59 that has an annular groove 68 at its lower end containing a sealing ring 69 that is in register with openings portions 23. Spring 64 urges valve element 67 toward a position for closing openings 23.

A second annular valve element 71 in chamber 60 encircles spacer 54 and has a groove 72 containing a sealing ring 83 that is in register with opening portions 22 to seal the same when pressed against face 18 by a spring 73 that bears against flange 43 and circumferentially spaced lugs 75 on valve element 71.

OPERATION

When solenoid 48 is deenergized spring 64 maintains valve element 67 seated against thrust chamber outer face 18 to seal ports 20 and spring 73 maintains valve element 71 seated against face 18 to seal ports 19.

When solenoid 48 is energized, magnetic flux paths indicated by the dotted line loops 77,78 are generated. These paths pass through the upper portions of valve elements 67 and 71 serially and simultaneously. Elements 67 and 71 are in effect, armatures and will be simultaneously moved away from face 18 to simultaneously open ports 19,20 whereupon fuel from chamber 60, which has entered through fuel inlet 39, and an oxidizer from chamber 59, which has entered through oxidizer inlet port 61, will simultaneously enter the respective ports 19,20 and be injected into combustion chamber 14 where they will contact each other and ignite.

Upon deenergization of solenoid 48 the magnetic flux paths 77,78 will instantly decay and springs 64,73 will simultaneously return the valve elements 67,71 against face 18 to simultaneously close ports 19,20 so that there will be no excess of either the oxidizer or the fuel entering combustion chamber 14. In addition, because ports 19,20 are short and of small diameter there will be a relatively small volume of the two propellant fluids in these ports to dribble out after the ports have been closed. Likewise, because of such low volume of ports 19,20 there is a very rapid delivery of the two propellants to the combustion chamber when the valve elements open. The result is that rocket engine response is rapid and crisp both when igniting the propellants and when the engine is shut down.

When valve elements 67 and 71 are open, seals 57 and 58 prevent leakage of fuel from chamber 59 to chamber 60, and vice versa so as to prevent ignition of propellants before they enter the combustion chamber. Seals 57,58 are static and therefore are not subject to wear or to weeping as is experienced with sliding seals, and thus provide greater assurance against leakage than sliding seals. In the unlikely event that either of the seals 57,58 should leak, the leakage fluid will collect in recess 27 and be carried overboard through vent port 28.

Face 18 against which valve elements 67,71 seat is shown as being on wall 17 of engine housing 13. However, wall 17 could be initially a part of valve housing 31 rather than of housing 13.

Although bipropellant valve 10 is shown and described as designed for use with a rocket engine, it can be used in many other applications where it is desired to simultaneously control flow of two fluids with a single solenoid.

I claim:

1. A solenoid operated valve comprising a housing having a first passage and a second passage, a first movable valve element in the housing controlling flow of fluid through the first passage, a second movable valve element in the housing controlling flow of fluid through the second passage, said second valve element being annular and surrounding said first valve element, and a single solenoid controlling movement of both valve elements.

2. The valve of claim 1 in which said housing and both said valve elements provide a path for magnetic flux generated by said solenoid.

3. The valve of claim 2 in which said housing includes a stationary portion located between said movable valve elements that provides a portion of said flux path.

4. The valve of claim 1 in which said valve elements are each moved by the solenoid to a position for opening the respective passage and each element is spring pressed to a position for closing the respective passage.

5. The valve of claim 1 in which each of said valve elements moves in an axial direction to control flow of fluid through the respective passage, and said passages are sealed from each other by static seals.

6. The valve of claim 1 in which said first passage includes a cylindrical chamber, said second passage includes an annular chamber, and said housing has an annular spacer providing a wall for each of said chambers.

7. The valve of claim 6 in which said first valve element is annular and has a close sliding fit with an interior cylindrical surface of said annular spacer.

8. The valve element of claim 6 in which said second valve element is annular and has a close sliding fit with an exterior cylindrical surface of said annular spacer.

9. The valve of claim 6 in which said valve elements are annular and said first passage includes a portion that is interior of the first valve element and said second passage includes a portion that is exterior of the second valve element.

10. The valve of claim 9 in which said first passage includes a portion that is central of said solenoid.

11. The valve of claim 1 in which each valve element is annular and has an end face seatable against a perforated wall for controlling flow of fluid through said passages.

12. The valve of claim 11 in which said housing includes an annular spacer that provides wall portions of each of said passages and has an end that is seatable against said wall.

13. The valve of claim 12 in which said first element is interiorly of said annular spacer and said second element, and said second element is exterior of said annular spacer.

14. A solenoid operated valve comprising a valve housing having a bore closed at one end by a solenoid housing, said solenoid housing having an annular spacer extending within said bore toward the other end of the same, the interior of the spacer forming a first valve chamber, a radial space between the exterior of the spacer and the bore that forms a second valve chamber, said solenoid having a first inlet connected to the first chamber, the valve housing having a second inlet port connected to the second chamber, a first movable valve element in the first chamber and a second valve element in the second chamber, and a single solenoid in said solenoid housing for controlling movement of both valve elements.

15. The valve of claim 1 in which said solenoid when energized moves both of said elements simultaneously.

16. The valve of claim 15 in which said elements are pressed by separate springs in one direction.

17. The valve of claim 14 in which said solenoid housing and said valve elements provide a path for magnetic flux for said solenoid.

18. The valve of claim 17 in which the valve elements are in series with respect to said flux path.

19. The valve of claim 14 in which said spacer forms a portion of the magnetic flux path generated by the solenoid when the latter is energized.

20. The valve of claim 19 in which said spacer has an end surface remote from said solenoid housing, and said end surface carries a pair of concentric annular sealing rings for sealing said end surface against a wall member adapted to close said chambers.

21. The valve of claim 14 in which said first inlet is central of said solenoid.

22. In combination, a valve assembly and a wall member having first and second ports through which fluid from two sources may be ejected, said valve assembly having a first passage for fluid from one of said sources and having a second passage for fluid from the other of said sources, first and second valve elements in the valve assembly each engageable with the wall member, said second valve element being annular and surrounding said first valve element, the first element controlling flow of fluid from the first passage to the first port and the second element controlling flow of fluid from the second passage to the second port, and a single solenoid in said valve assembly for moving said valve elements out of engagement with said wall member for connecting each passage with a respective one of said ports.

23. The combination of claim 22 in which said valve assembly, includes an annular spacer extending into engagement with said wall member, and one of said passages is interiorly of said spacer and the other is exterior thereof.

24. The combination of claim 22 wherein both of said valve elements are annular, said first passage includes a chamber interiorly of said first valve element, said second passage includes a chamber exterior of said second valve element.

* * * * *